United States Patent
Hawley et al.

(10) Patent No.: US 10,195,818 B2
(45) Date of Patent: Feb. 5, 2019

(54) REINFORCING ARTICLE

(71) Applicant: INTEGRATED COMPOSITE PRODUCTS, INC., Rochester, MN (US)

(72) Inventors: Ronald Clare Hawley, Winona, MN (US); Derek Joel Mazula, Sioux Falls, SD (US)

(73) Assignee: Integrated Composite Products, Inc., Rochester, MN (US)

( * ) Notice: Subject to any disclaimer, the term of this patent is extended or adjusted under 35 U.S.C. 154(b) by 0 days.

(21) Appl. No.: 15/503,593

(22) PCT Filed: Aug. 12, 2015

(86) PCT No.: PCT/US2015/044789
§ 371 (c)(1),
(2) Date: Feb. 13, 2017

(87) PCT Pub. No.: WO2016/025564
PCT Pub. Date: Feb. 18, 2016

(65) Prior Publication Data
US 2017/0232703 A1    Aug. 17, 2017

Related U.S. Application Data

(60) Provisional application No. 62/036,852, filed on Aug. 13, 2014.

(51) Int. Cl.
*B32B 5/12* (2006.01)
*B29C 70/52* (2006.01)
(Continued)

(52) U.S. Cl.
CPC .............. *B32B 5/12* (2013.01); *B29C 70/081* (2013.01); *B29C 70/083* (2013.01);
(Continued)

(58) Field of Classification Search
CPC ....................................................... B32B 5/12
(Continued)

(56) References Cited

U.S. PATENT DOCUMENTS

| | | |
|---|---|---|
| 2,545,981 A | 3/1951 | Warp |
| 2,877,501 A | 3/1959 | Bradt |

(Continued)

FOREIGN PATENT DOCUMENTS

| | | |
|---|---|---|
| EP | 0 552 918 A1 | 7/1993 |
| WO | WO 01/51730 A1 | 7/2001 |

(Continued)

OTHER PUBLICATIONS

U.S. Appl. No. 15/549,805, filed Aug. 9, 2017, Hawley et al.
(Continued)

*Primary Examiner* — Brent T O'Hern
(74) *Attorney, Agent, or Firm* — Mueting, Raasch & Gebhardt, P.A.

(57) ABSTRACT

A reinforcing article (10, 100, 200) includes a porous substrate layer (105, 205) and a plurality of parallel first continuous fiber elements (12, 114, 212) spaced apart from each other and extending along a first direction and fixed to the porous substrate (105, 205). Each first continuous fiber element (12, 114, 212) includes a plurality of parallel and co-extending continuous fibers (22, 122, 222) embedded in a thermoplastic resin (24, 124, 224).

20 Claims, 4 Drawing Sheets

(51) Int. Cl.
  *B29C 70/68* (2006.01)
  *B29D 28/00* (2006.01)
  *B29C 70/08* (2006.01)
  *B29C 70/22* (2006.01)
  *B32B 5/02* (2006.01)
  *B32B 5/26* (2006.01)
  *B32B 27/08* (2006.01)
  *B32B 27/20* (2006.01)
  *B29K 105/20* (2006.01)
  *B29C 70/02* (2006.01)

(52) U.S. Cl.
  CPC .......... *B29C 70/224* (2013.01); *B29C 70/228* (2013.01); *B29C 70/52* (2013.01); *B29C 70/688* (2013.01); *B29D 28/005* (2013.01); *B32B 5/022* (2013.01); *B32B 5/024* (2013.01); *B32B 5/26* (2013.01); *B32B 27/08* (2013.01); *B32B 27/20* (2013.01); *B29C 70/023* (2013.01); *B29K 2105/206* (2013.01); *B29K 2995/0088* (2013.01); *B29K 2995/0089* (2013.01); *B32B 2250/40* (2013.01); *B32B 2260/021* (2013.01); *B32B 2260/046* (2013.01); *B32B 2262/02* (2013.01); *B32B 2262/0269* (2013.01); *B32B 2262/101* (2013.01); *B32B 2262/103* (2013.01); *B32B 2262/105* (2013.01); *B32B 2262/106* (2013.01); *B32B 2307/558* (2013.01); *B32B 2307/718* (2013.01)

(58) Field of Classification Search
  USPC ........................................................ 428/109
  See application file for complete search history.

(56) References Cited

U.S. PATENT DOCUMENTS

| | | | |
|---|---|---|---|
| 3,425,204 A | 2/1969 | Schuller et al. | |
| 3,680,495 A | 8/1972 | Pike | |
| 3,691,000 A | 9/1972 | Kalnin | |
| 4,051,290 A | 9/1977 | Jutte et al. | |
| 4,289,465 A | 9/1981 | Killmeyer et al. | |
| 4,312,917 A | 1/1982 | Hawley | |
| 4,357,292 A | 11/1982 | Myers | |
| 4,492,607 A | 1/1985 | Halcomb | |
| 4,623,281 A | 11/1986 | Verbauwhede et al. | |
| 4,636,422 A | 1/1987 | Harris et al. | |
| RE32,772 E | 10/1988 | Hawley | |
| 4,937,032 A | 6/1990 | Krone et al. | |
| 5,045,377 A | 9/1991 | Amata | |
| 5,073,441 A | 12/1991 | Melec et al. | |
| 5,164,255 A | 11/1992 | Weeks | |
| 5,246,520 A | 9/1993 | Scanlon et al. | |
| 5,344,687 A | 9/1994 | Grimnes | |
| 5,360,503 A | 11/1994 | Coffy | |
| 5,460,673 A | 10/1995 | Cahuzac | |
| 5,514,745 A | 5/1996 | Yoshino | |
| 5,593,633 A | 1/1997 | Dull et al. | |
| 5,779,961 A | 7/1998 | Teutsch | |
| 5,868,080 A | 2/1999 | Wyler et al. | |
| 5,961,288 A | 10/1999 | Rene Legendre et al. | |
| 6,368,701 B1 | 4/2002 | Nomura et al. | |
| 6,655,299 B2 | 12/2003 | Preisler et al. | |
| 6,844,040 B2 | 1/2005 | Pabedinskas et al. | |
| 7,048,880 B2 | 5/2006 | Kia et al. | |
| 7,592,388 B2 | 9/2009 | Wick et al. | |
| 7,814,741 B2 | 10/2010 | Hattori et al. | |
| 8,376,426 B2 | 2/2013 | Choi et al. | |
| 8,815,368 B2 | 8/2014 | Neitzke | |
| 8,985,034 B2 | 3/2015 | Dummett | |
| 2002/0088599 A1 | 7/2002 | Davis et al. | |
| 2003/0062647 A1 | 4/2003 | Deteresa et al. | |
| 2010/0028616 A1 | 2/2010 | Yamanouchi et al. | |
| 2010/0092770 A1 | 4/2010 | Wadahara et al. | |
| 2010/0239856 A1 | 9/2010 | Olson et al. | |
| 2012/0048154 A1 | 3/2012 | Toomer et al. | |
| 2013/0164501 A1 | 6/2013 | Jung et al. | |
| 2013/0309442 A1 | 11/2013 | Ruby et al. | |
| 2014/0178635 A1 | 6/2014 | Imaizumi et al. | |
| 2014/0186600 A1 | 7/2014 | Dyksterhouse | |
| 2014/0196837 A1 | 7/2014 | Polewarczyk et al. | |
| 2015/0151506 A1 | 6/2015 | Hawley et al. | |

FOREIGN PATENT DOCUMENTS

| | | |
|---|---|---|
| WO | WO 2004/101909 A1 | 11/2004 |
| WO | WO 2010/108015 A2 | 9/2010 |
| WO | WO 2013/021848 A1 | 2/2013 |
| WO | WO 2013/032620 A1 | 3/2013 |
| WO | WO 2015/013529 A1 | 1/2015 |
| WO | WO 2016/025564 A2 | 2/2016 |
| WO | WO 2016/025564 A3 | 2/2016 |
| WO | WO 2016/130784 A1 | 8/2016 |

OTHER PUBLICATIONS

International Patent Application No. PCT/US2014/048048, filed Jul. 24, 2014; International Search Report and Written Opinion, dated Nov. 5, 2014; 12 pages.

International Patent Application No. PCT/US2014/048048, filed Jul. 24, 2014; International Preliminary Report on Patentability dated Feb. 4, 2016; 8 pages.

International Patent Application No. PCT/US2015/044789, filed Aug. 12, 2015; International Search Report and Written Opinion dated Feb. 16, 2016; 19 pages.

International Patent Application No. PCT/US2015/044789, filed Aug. 12, 2015; International Preliminary Report on Patentability dated Feb. 23, 2017; 12 pages.

International Patent Application No. PCT/US2016/017519, filed Feb. 11, 2016; International Search Report and Written Opinion, dated May 6, 2016; 11 pages.

International Patent Application No. PCT/US2016/017519, filed Feb. 11, 2016; International Preliminary Report on Patentability dated Aug. 24, 2017; 7 pages.

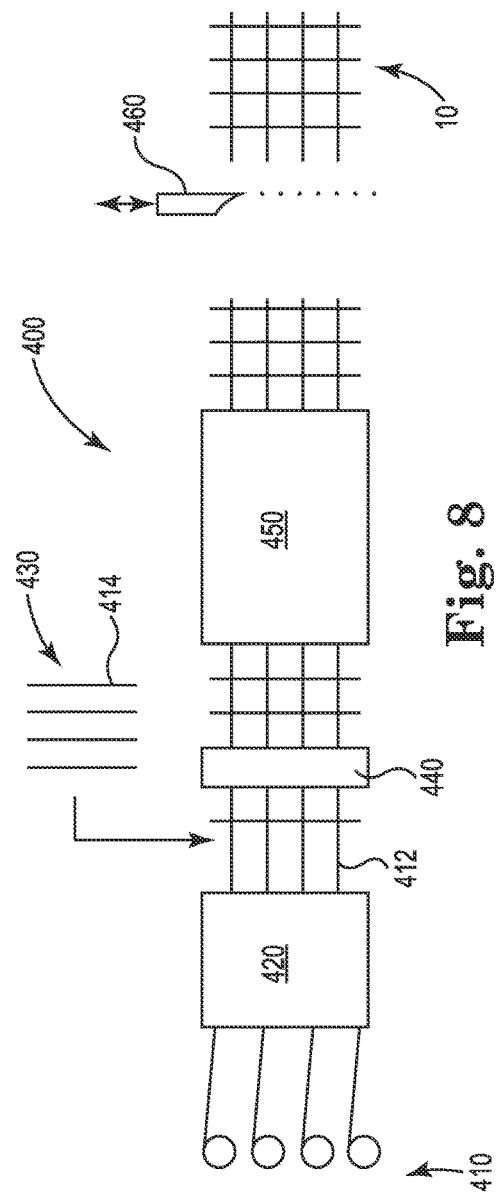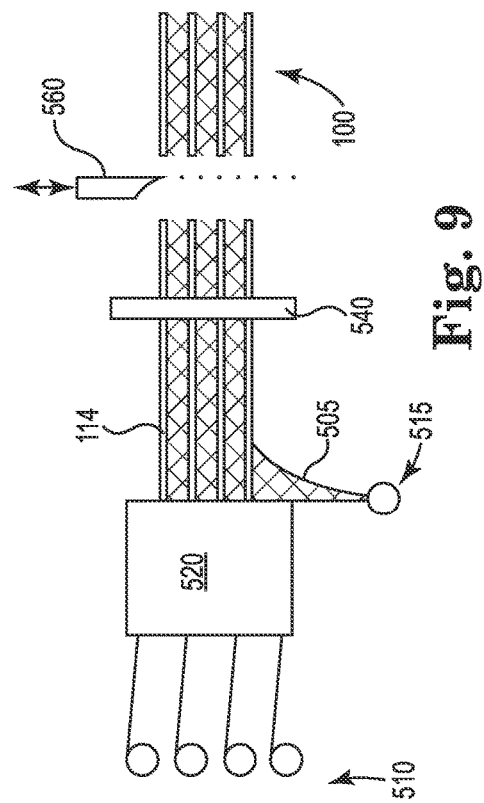

REINFORCING ARTICLE

This application is the § 371 U.S. National Stage of International Application No. PCT/US2015/044789, filed Aug. 12, 2015, which claims the benefit of U.S. Provisional Application No. 62/036,852, filed Aug. 13, 2014, the disclosures of which are incorporated by reference herein in their entireties.

BACKGROUND

The physical properties of thermoplastic polymers can be improved by the incorporation of filler materials such as glass fibers. The incorporation of glass fibers into polymeric products beneficially affects resin properties such as tensile strength, stiffness, dimensional stability and resistance to creep and thermal expansion. Traditional methods of producing such articles have been injection molding or compression molding standard, pre-compounded fiber glass-filled polymer. While satisfying certain objectives in optimizing the quality of the finished product, conventional filled products have proven to be commercially costly and in other ways have fallen short of their objectives in terms of weight, impact performance and strength. Improvements to producing fiber-reinforced articles are desired.

SUMMARY

The present disclosure relates to a reinforcing article and methods of making the same. The reinforcing article can improve the structure properties while reducing the weight and/or cost of the composite structural article.

In one aspect, a reinforcing article includes a porous substrate layer and a plurality of parallel first continuous fiber elements spaced apart from each other and extending along a first direction and fixed to the porous substrate. Each first continuous fiber element includes a plurality of parallel and co-extending continuous fibers embedded in a thermoplastic resin.

In another aspect, a reinforcing article includes a plurality of parallel first continuous fiber elements extending along a first direction, and a plurality of parallel second continuous fiber elements extending along a second direction different than the first direction. Each first and second continuous fiber elements have a plurality of parallel and co-extending continuous fibers embedded in a thermoplastic resin. The plurality of parallel first continuous fiber elements and plurality of parallel first continuous fiber elements are fixed to each other and form an open lattice structure defining a plurality of openings.

In another aspect, a composite structural article includes a polymeric body having a first major surface and an opposing second major surface and reinforcing article as described herein embedded within and coplanar with the first major surface or the opposing second major surface.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which:

FIG. 8 is a schematic diagram of an illustrative process of forming the open lattice reinforcing article described herein; and FIG. 9 is a schematic diagram of another illustrative process of forming the reinforcing article described herein.

DETAILED DESCRIPTION

Figure 1:
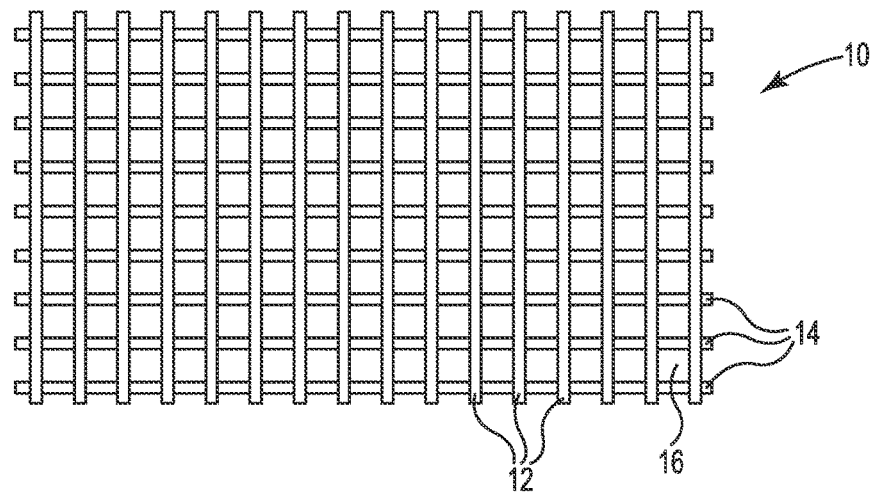
FIG. 1 is a top view schematic diagram view of an illustrative open lattice reinforcing article.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

It should be noted that "top" and "bottom" (or other terms like "upper" and "lower" or "first" and "second") are utilized strictly for relative descriptions and do not imply any overall orientation of the article in which the described element is located.

The present disclosure relates to a reinforcing article and methods of making the same. The reinforcing article described herein can improve the structure properties while reducing the weight and/or cost of the composite structural article. The reinforcing article can include a plurality of parallel continuous fiber elements where each continuous fiber element includes a plurality of continuous fibers embedded in a thermoplastic resin. The plurality of parallel continuous fiber elements can be fixed to a porous substrate that allows molten polymer to flow through the reinforcing member and porous substrate. In some embodiments the reinforcing member includes a plurality of second parallel continuous fiber elements forming an open lattice structure. In some of these embodiments a porous substrate separates the first continuous fiber elements from the second continuous fiber elements. The reinforcing article can be embedded within the polymeric body. The open lattice reinforcing article can be placed strategically within the polymeric body to provide strength where it is needed within the polymeric body. These composite structural articles possess a high strength, stiffness, and high impact resistant with a reduced weight as compared to conventional structural members. While the present disclosure is not so limited, an appreciation of various aspects of the disclosure will be gained through a discussion of the examples provided below.

Figure 2:
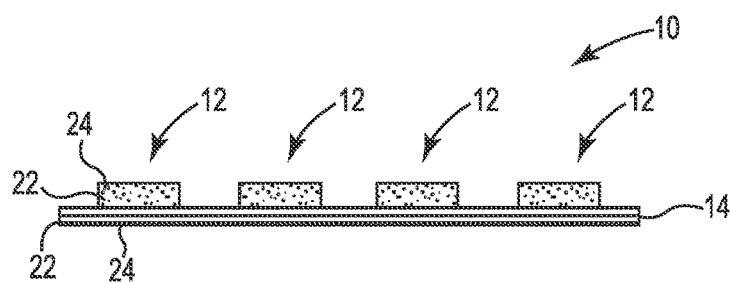
FIG. 2 is a cross-section schematic diagram view of the open lattice reinforcing article of FIG. 1.

FIG. 1 is a top view schematic diagram view of an illustrative open lattice reinforcing article 10. FIG. 2 is a cross-section schematic diagram view of the open lattice reinforcing article 10 of FIG. 1.

A reinforcing article 10 or open lattice reinforcing member 10 includes a plurality of parallel first continuous fiber elements 12 extending along a first direction, and a plurality of parallel second continuous fiber elements 14 extending along a second direction different than the first direction. Each first and second continuous fiber elements have a plurality of parallel and co-extending continuous fibers 22 embedded in a thermoplastic resin 24. The first plurality of parallel first continuous fiber elements 12 and second plurality of parallel second continuous fiber elements 14 are fixed to each other and form an open lattice structure defining a plurality of openings 16. Preferably the plurality of a parallel first continuous fiber elements 12 extending along a first direction, and a plurality of parallel second continuous fiber elements 14 extend along a second direction that is orthogonal to the first direction. The plurality of first continuous fiber elements 12 cooperate with the plurality of second continuous fiber elements 14 to define the lattice openings 16 of at least 1 mm, or at least 2 mm, or at least 5 mm or at least 10 mm in the open lattice structure 10.

The open lattice reinforcing member 10 can have any useful void size separating the intersecting continuous fiber members 12, 14. In preferred embodiments the openings are in a range from about ⅛ inch to about ½ inch square or in mesh size of about 8 to about 2 mesh or from about 4 to about 5 mesh (openings per inch). In many embodiments the openings have an average lateral distance of at least 1 mm or at least 2 mm or at least 5 mm. The opening allows molten polymer to flow through the open lattice reinforcing article 10 during a molding process.

The continuous fiber members 12, 14 can be formed of any suitable fiber material providing tensile strength and/or stiffness. A plurality of continuous fibers 22 can extend along a longitudinal axis in a parallel and co-extensive manner as a continuous fiber element 12, 14 or bundle held together with a thermoplastic resin 24. The continuous fibers 22 can be composed of: glass, carbon, graphite, basalt, DuPont Kevlar brand aramid fibers, ceramics, natural fibers, polymeric fibers, and various metals preferably glass, carbon, graphite or Kevlar.

Each continuous fiber element 12, 14 or bundle can have a diameter or largest lateral dimension in a range from 250 to 10000 micrometers or from 500 to 5000 micrometers or from 1000 to 3000 micrometers. Each continuous fiber element 12, 14 or bundle can have at least 40% wt fiber or at least 50% wt fiber or from 40 to 90% wt fiber or from 50 to 80% wt fiber. Each continuous fiber element or bundle can have at from 60 to 10% wt resin or from 50 to 20% wt resin.

The resin forming the continuous fiber members 12, 14 can be any suitable polymeric material. In many embodiments the polymeric material is a thermoplastic material. Useful polymeric material includes polypropylene, polyethylene, nylon, acrylonitrile butadiene styrene, styrene acrylonitrile, acrylic or styrene, for example. Further useful polymers include PBT polyester, PET polyester, polyoxymethylene, polycarbonite or polyphenylene sulfide for example. Higher temperature polymeric material includes polysulfone, polyethersulfone, polyethereetherketone, or liquid crystal polymer, for example.

In many embodiments the resin utilized to form the first plurality of continuous fiber element or bundle 12 is compatible with, or is the same type or kind of, resin material forming the second plurality of continuous fiber element or bundle 14 or solid or polymeric body of the composite structural element (described below). This configuration allows the resin on each first plurality of continuous fiber element or bundle 12 to fuse or fix to the resin on each second plurality of continuous fiber element or bundle 14.

The continuous fibers within the continuous fiber members 12, 14 can have any suitable diameter such as 5 to 100 micrometers or less than 50 micrometers or from 10 to 50 micrometers or from for example 10 to 30 micrometers. The continuous fiber members 12, 14 or bundles are formed of a plurality of parallel and co-extending continuous fibers. Preferably the continuous fiber members 12, 14 or bundles are formed of at least 100 or at least 1000 individual and parallel and co-extending continuous fibers or at least 2500 individual and parallel and co-extending continuous fibers or at least 5000 individual and parallel and co-extending continuous fibers or at least 7500 individual and parallel and co-extending continuous fibers. The plurality of parallel and co-extending continuous fibers are disposed within a resin to form the continuous fiber element or bundle, as described above.

The continuous fiber within the continuous fiber members 12, 14 can have any suitable length and is typically at least extend the length of the continuous fiber members 12, 14. In many embodiments the continuous fiber within the continuous fiber members 12, 14 has a length of at least 0.1 meter, or 0.5 meter or 1 meter or greater than 1 meter.

Figure 3:
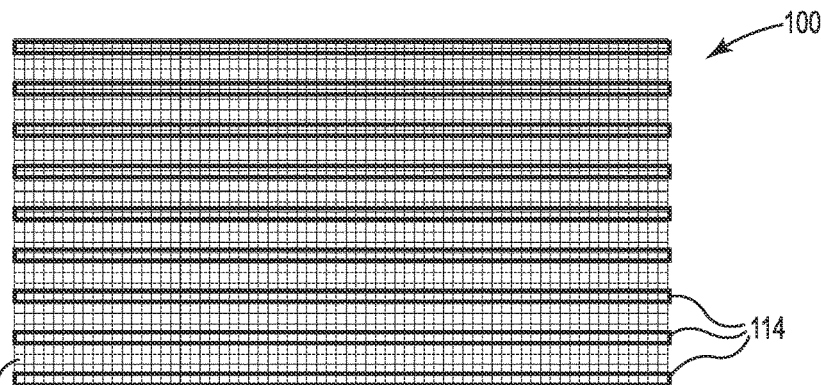
FIG. 3 is a top view schematic diagram view of another illustrative reinforcing article.
Figure 4:
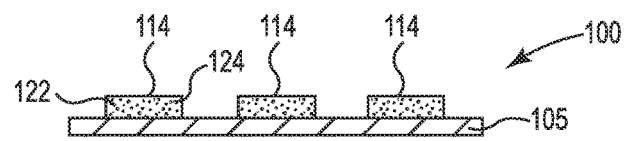
FIG. 4 is a cross-section schematic diagram view of the reinforcing article of FIG. 3.

FIG. 3 is a top view schematic diagram view of another illustrative reinforcing member 100. FIG. 4 is a cross-section schematic diagram view of the reinforcing member 100 of FIG. 3.

The reinforcing article 100 includes a porous substrate layer 105, and a plurality of parallel first continuous fiber elements 114 spaced apart from each other and extending along a first direction and fixed to the porous substrate 105. Each first continuous fiber element 114 includes a plurality of parallel and co-extending continuous fibers 122 embedded in a thermoplastic resin 124, as described above.

The porous substrate 105 allows molten polymer material to flow through the porous substrate. In many embodiments, the porous substrate is an open lattice substrate (that may be a woven substrate) having lattice openings of at least 0.5 mm or at least 1 mm and a substrate weight in a range from 30 grams/meter$^2$ to 800 grams/meter$^2$ or from 60 grams/meter$^2$ to 700 grams/meter$^2$. In other embodiments, the porous substrate is a non-woven substrate having a substrate weight in a range from 20 grams/meter$^2$ to 150 grams/meter$^2$ or from 30 grams/meter$^2$ to 100 grams/meter$^2$. The woven or nonwoven porous substrate can be composed of: glass, carbon, graphite, basalt, DuPont Kevlar brand aramid fibers, ceramics, natural fibers, polymeric fibers, or metal.

Figure 5:
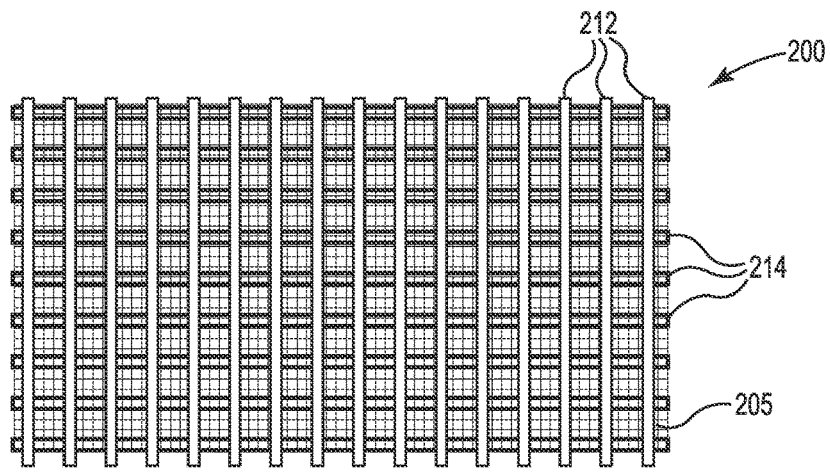
FIG. 5 is a top view schematic diagram view of another illustrative open lattice reinforcing article.
Figure 6:
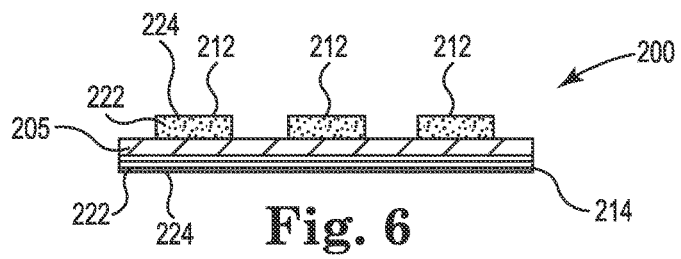
FIG. 6 is a cross-section schematic diagram view of the open lattice reinforcing article of FIG. 5.

FIG. 5 is a top view schematic diagram view of another illustrative open lattice reinforcing member 200. FIG. 6 is a cross-section schematic diagram view of the open lattice reinforcing member 200 of FIG. 5.

In these embodiments, the reinforcing article 200 is similar to the reinforcing article shown in FIG. 3 and FIG. 4 and further includes a plurality of parallel second continuous fiber elements 212 spaced apart from each other and extending along a second direction different than the first direction. Each second continuous fiber element 212 includes a plurality of parallel and co-extending continuous fibers 222 embedded in a thermoplastic resin 224 (as described above), and the plurality of parallel second continuous fiber elements 212 are fixed to the porous substrate layer 205 and the porous substrate layer 205 separates the first continuous fiber element 214 from the second continuous fiber elements 212.

Preferably the plurality of a parallel first continuous fiber elements 212 extending along a first direction, and the plurality of parallel second continuous fiber elements 214 extend along a second direction that is orthogonal to the first direction. The plurality of first continuous fiber elements 212 cooperate with the plurality of second continuous fiber elements 214 to define the lattice openings of at least 1 mm, or at least 2 mm, or at least 5 mm or at least 10 mm in the open lattice structure 200.

Figure 7:
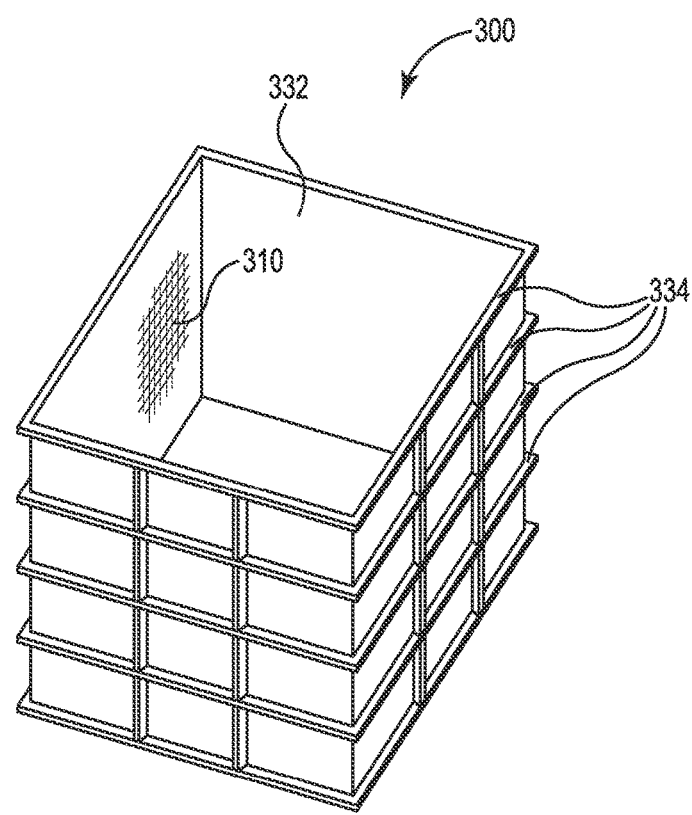
FIG. 7 is a perspective view of a container formed of composite structural articles including reinforcing article described herein.

FIG. 7 is a perspective view of a container 300 formed of reinforcing articles 310 described herein. The container 300 is formed of at least four composite structural panels. Each composite structural panel or side of the container 300, includes the reinforcing article 310 embedded in and coplanar with the major surface 332. In this embodiment, a first major surface 332 is planar and an opposing second major surface includes a plurality of intersecting rib elements 334 that extend away from the second major surface. A first plurality of parallel rib elements extend along a length of the panel member and a second plurality of parallel rib elements extend along a width of the panel members. The first plurality of rib elements intersect and are orthogonal to the second plurality of rib elements.

The solid or polymeric body can be formed of any suitable polymeric material. In many embodiments the polymeric material is a thermoplastic material. Useful polymeric material includes polypropylene, polyethylene, nylon, acrylonitrile butadiene styrene, styrene acrylonitrile, acrylic or styrene, for example. Further useful polymers include PBT polyester, PET polyester, polyoxymethylene, polycarbonite or polyphenylene sulfide for example. Higher temperature polymeric material includes polysulfone, polyethersulfone, polyethereetherketone, or liquid crystal polymer, for example.

In many embodiments the resin utilized to form the continuous fiber elements 12, 14 is compatible with, or is the same type or kind of, resin material forming the solid or polymeric body of the composite structural element. In some embodiments the embedding surface of the container is a textured surface. The term "textured" refers to a surface having uniform or non-uniform undulating surface or peaks and valleys along the surface having a lateral height difference equal to at least the 50% of the diameter of the fiber bundle elements forming the reinforcing article 310.

The polymeric material can includes a plurality of random fibers forming a fiber dispersion in the polymeric material. This fiber dispersion has an average fiber length of less than 15 mm or less than 12 mm or less than 5 mm or less than 1 mm. The fiber dispersion has an average fiber length in a range from 1 to 15 mm or in a range from 5 to 12 mm and can be termed "long fiber thermoplastic". In other embodiments, the fiber dispersion has an average fiber length in a range from 0.1 to 1 mm or in a range from 0.25 to 0.75 mm and can be termed "short fiber thermoplastic". The fibers forming this fiber dispersion can be formed of materials that are the same or different than the material forming the continuous fiber members such as glass, carbon, basalt, graphite, DuPont Kevlar brand aramid fibers, ceramics, natural fibers, polymeric fibers, and various metals, for example.

The fiber dispersion can be present in the polymeric material in a range from 5 to 60% by weight. Preferably the fiber dispersion can be present in the polymeric material in a range from 10 to 50% by weight, or in a range from 20 to 45% by weight, or in a range from 30 to 40% by weight. Useful polymeric material with fiber dispersions are commercially available from RTP Company, Winona, Minn. under the trade designations "RTP 107" (polypropylene with 40% wt short glass fiber dispersion) and "RTP 80107" (polypropylene with 40% wt long glass fiber dispersion), for example.

FIG. 8 is a schematic diagram of an illustrative process 400 of forming the open lattice reinforcing article 10 described herein. Fiber spools 410 provide a bundle of continuous fiber to an extruder die 420. The extruder die 420 embeds the bundle of continuous fiber within resin material and forming first plurality of a parallel first continuous fiber elements 412 extending along a first direction. A second plurality of a parallel second continuous fiber elements 414 extending along a second direction different than the first direction and comprising a plurality of parallel and co-extending continuous fibers embedded in a resin are provided 430 and disposed on the first plurality of a parallel first continuous fiber elements 412. These continuous fiber members 412, 414 can then go through a nip roller 440 to apply pressure to the continuous fiber members 412, 414. Then the continuous fiber members 412, 414 can pass though puller element 450 then and diced 460 or cut to an appropriate size to form the open lattice reinforcing article 10 described herein.

FIG. 9 is schematic diagram of another illustrative process 500 of forming the reinforcing member 100 described herein. Fiber spools 510 provide a bundle of continuous fiber to an extruder die 520. The extruder die 520 embeds the bundle of continuous fiber within resin material and form a first plurality of a parallel first continuous fiber elements 114 extending along a first direction. A substrate 505 (described above) is removed from a roll 510 and moved onto the plurality of continuous fiber members 114 (described herein). The continuous fiber members 114 and porous substrate 505 can then go through a nip roller 540 to apply pressure to the continuous fiber members 114 and fix them onto the porous substrate 505. Then the continuous fiber members 114 and porous substrate 505 can then be diced 560 or cut to an appropriate size to form the reinforcing article 100 described herein.

In some embodiments the plurality of parallel and co-extending second continuous fibers are provided on opposing side of the porous substrate. This porous substrate (for example, a scrim layer) and second plurality of parallel elements can be layered onto the first plurality of parallel first continuous fiber elements in any manner. For example the porous substrate can separate the plurality of parallel continuous fiber elements from the second plurality of parallel continuous fiber elements. In other embodiments the porous substrate can be fixed to or releasably adhered to either the plurality of parallel continuous fiber elements or the second plurality of parallel continuous fiber elements.

The composite structural article can be formed by any suitable method. In many embodiments the reinforcing article can be placed in a suitable mold and the polymeric material disposed into the mold to form the composite structural article. Preferably the composite structural articles are formed by flowing molten polymer through the porous reinforcing article described herein by inserting the porous reinforcing article in a mold and polymer material is compression molded or injection molded through the reinforcing article to form the composite structural article.

The reinforcing article described herein can be utilized in structural composite articles for a variety of industries, markets and applications. The composite articles described herein are particularly useful for: automotive parts such as bumpers, fenders; transportation such as pallets and containers; aerospace such as airplane components; military such as missile components; recreation such as vehicle frame components.

Thus, embodiments of REINFORCING ARTICLE are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A reinforcing article comprising:
a porous substrate layer; and
a plurality of parallel first continuous fiber elements spaced apart from each other and extending along a first direction and fixed to the porous substrate layer, each first continuous fiber element comprising a plurality of parallel and co-extending continuous fibers embedded in a thermoplastic resin;
a plurality of parallel second continuous fiber elements spaced apart from each other and extending along a second direction different than the first direction, each second continuous fiber element comprising a plurality of parallel and co-extending continuous fibers embedded in a thermoplastic resin, and the plurality of parallel second continuous fiber elements are fixed to the porous substrate layer; and
the first plurality of parallel first continuous fiber elements and the second plurality of parallel first continuous fiber elements are fixed to each other and form an open lattice structure defining a plurality of openings.

2. The article according to claim 1, wherein the porous substrate layer is an open lattice substrate having lattice openings of at least 1 mm and a substrate weight in a range from 60 grams/meter$^2$ to 700 grams/meter$^2$.

3. The article according to claim 1, wherein the porous substrate layer is a non-woven substrate having a substrate weight in a range from 30 grams/meter$^2$ to 100grams/meter$^2$.

4. The article according to claim 1, wherein the first continuous fiber elements each comprise at least 100 parallel and co-extending continuous fibers embedded within the thermoplastic resin and the second continuous fiber elements each comprise at least 100 parallel and co-extending continuous fibers embedded with the thermoplastic resin.

5. The reinforcing article according to claim 1, wherein the first continuous fiber elements comprises 40-90% wt fiber and 60-10% resin and the second continuous fiber elements comprises 40-90% wt fiber and 60-10% resin.

6. The reinforcing article according to claim 1 wherein the porous substrate layer separates the first continuous fiber elements from the second continuous fiber elements.

7. The reinforcing article according to claim 1, wherein the first continuous fiber elements are orthogonal to the second continuous fiber elements.

8. The reinforcing article according to claim 1, wherein the first continuous fiber elements and the second continuous fiber elements cooperate to define lattice openings of at least 1 mm.

9. A composite structural article comprising:
a polymeric body having a first major surface and an opposing second major surface; and
a reinforcing article according to claim 1 embedded within and coplanar with the first major surface or second major surface.

10. The composite structural article according to claim 9, further comprising a plurality of fibers forming a fiber dispersion within the polymeric body, the fibers having an average length of less than 15 mm and an average diameter of less than 50 micrometers.

11. The composite structural article according to claim 10 wherein the fiber dispersion has an average length of less than 1 mm.

12. The composite structural article according to claim 11, wherein the polymeric body comprises 10% to 50% by weight fiber dispersion.

13. The article according to claim 2, wherein the porous substrate layer comprises glass fibers.

14. The article according to claim 1, wherein the porous substrate layer is a non-woven substrate having a substrate weight in a range from 20 grams/meter$^2$ to 150 grams/meter$^2$.

15. The article according to claim 14, wherein the porous substrate layer has a substrate weight in a range from 30 grams/meter$^2$ to 100 grams/meter$^2$.

16. The article according to claim 15, wherein the porous substrate layer comprises glass fibers.

17. The article according to claim 1, wherein the first continuous fiber elements each comprise at least 1000 parallel and co-extending continuous fibers embedded within the thermoplastic resin and the second continuous fiber elements each comprise at least 1000 parallel and co-extending continuous fibers embedded with the thermoplastic resin.

18. The reinforcing article according to claim 17, wherein the first continuous fiber elements comprises 50-80 wt fiber and 50-20% resin and the second continuous fiber elements comprises 50-80% wt fiber and 50-20% resin.

19. The reinforcing article according to claim 18, wherein the first continuous fiber elements comprise glass fibers and the second continuous fiber elements comprise glass fibers.

20. The reinforcing article according to claim 19, wherein the first continuous fiber elements parallel and co-extending continuous fibers have a diameter in a range from 10 to 50 micrometers and the second continuous fiber elements parallel and co-extending continuous fibers have a diameter in a range from 10 to 50 micrometers.

\* \* \* \* \*